(12) United States Patent
Shao et al.

(10) Patent No.: US 11,435,624 B2
(45) Date of Patent: Sep. 6, 2022

(54) LCD DEVICE AND MANUFACTURING METHOD THEREOF

(71) Applicant: TCL China Star Optoelectronics Technology Co., Ltd., Shenzhen (CN)

(72) Inventors: Yuan Shao, Shenzhen (CN); Chunqiu Yan, Shenzhen (CN); Hsiaohsien Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 262 days.

(21) Appl. No.: 16/648,241

(22) PCT Filed: Jan. 7, 2020

(86) PCT No.: PCT/CN2020/070646
§ 371 (c)(1),
(2) Date: Mar. 18, 2020

(87) PCT Pub. No.: WO2021/128468
PCT Pub. Date: Jul. 1, 2021

(65) Prior Publication Data
US 2021/0356790 A1 Nov. 18, 2021

(30) Foreign Application Priority Data

Dec. 25, 2019 (CN) .......................... 201911354288.1

(51) Int. Cl.
*G02F 1/1339* (2006.01)
*G02F 1/1333* (2006.01)
*G02F 1/1343* (2006.01)

(52) U.S. Cl.
CPC ...... *G02F 1/13394* (2013.01); *G02F 1/13396* (2021.01); *G02F 1/13398* (2021.01);
(Continued)

(58) Field of Classification Search
CPC .......... G02F 1/13394; G02F 1/133382; G02F 1/13396; G02F 1/13398
See application file for complete search history.

(56) References Cited

U.S. PATENT DOCUMENTS 9,927,661 B2 3/2018 Park et al.
2002/0075444 A1* 6/2002 Gutfeld ................. G02F 1/1341
349/156

(Continued)

FOREIGN PATENT DOCUMENTS

CN 1274092 11/2000
CN 1930517 3/2007
(Continued)

*Primary Examiner* — Mariam Qureshi

(57) ABSTRACT

The disclosure provides a liquid crystal display (LCD) device and a manufacturing method thereof. A temperature sensing driver chip is disposed in the LCD device and can output a voltage signal to a control electrode according to changes in temperature. Therefore, an electric field is formed between the control electrode and a common electrode. Heights of a plurality of supporting posts can be changed by the electric field to control stretching and shrinking of the control electrode, thereby improving performance of the supporting posts. Thus, a plurality of organic material spheres disposed in the supporting posts can improve stress tolerance of the supporting posts, thereby further improving performance of the supporting posts.

18 Claims, 3 Drawing Sheets

(52) U.S. Cl.
CPC .... *G02F 1/13439* (2013.01); *G02F 1/133382* (2013.01); *G02F 1/134309* (2013.01)

(56) References Cited

U.S. PATENT DOCUMENTS

| | | | |
|---|---|---|---|
| 2007/0070285 A1* | 3/2007 | Liu | G02F 1/13394 |
| | | | 349/156 |
| 2007/0121051 A1 | 5/2007 | Yokoyama et al. | |
| 2009/0086151 A1* | 4/2009 | Seo | G02F 1/13394 |
| | | | 349/187 |
| 2013/0147737 A1 | 6/2013 | Zhou et al. | |
| 2014/0062981 A1* | 3/2014 | Huang | G09G 3/3648 |
| | | | 257/E31.127 |
| 2016/0116781 A1 | 4/2016 | Wu et al. | |
| 2016/0187703 A1 | 6/2016 | Tang | |
| 2020/0301189 A1* | 9/2020 | Qu | G06F 3/0414 |

FOREIGN PATENT DOCUMENTS

| | | |
|---|---|---|
| CN | 101359132 | 2/2009 |
| CN | 101398588 | 4/2009 |
| CN | 102636899 | 8/2012 |
| CN | 102654948 | 9/2012 |
| CN | 102707470 | 10/2012 |
| CN | 102707504 | 10/2012 |
| CN | 102749760 | 10/2012 |
| CN | 103163690 | 6/2013 |
| CN | 103323982 | 9/2013 |
| CN | 103913897 | 7/2014 |
| CN | 104317112 | 1/2015 |
| CN | 104360544 | 2/2015 |
| CN | 104570503 | 4/2015 |
| CN | 105629592 | 6/2016 |
| CN | 105824153 | 8/2016 |
| CN | 105892134 | 8/2016 |
| CN | 105911774 | 8/2016 |
| CN | 106252381 | 12/2016 |
| JP | 02-212816 | 8/1990 |

\* cited by examiner

LCD DEVICE AND MANUFACTURING METHOD THEREOF

RELATED APPLICATIONS

This application is a National Phase of PCT Patent Application No. PCT/CN2020/070646 having International filing date of Jan. 7, 2020, which claims the benefit of priority of Chinese Patent Application No. 201911354288.1 filed on Dec. 25, 2019. The contents of the above applications are all incorporated by reference as if fully set forth herein in their entirety.

FIELD AND BACKGROUND OF THE INVENTION

The present disclosure relates to the field of display technologies, and more particularly, relates to a liquid crystal display (LCD) device and a manufacturing method thereof.

In LCD panels, a liquid crystal cell is supported by multiple supporting posts to maintain thickness uniformity. However, when display panels are tested, requirements for the supporting posts are opposite in different testing processes. For example, a high elastic recovery rate of the supporting posts is required during a high-temperature test, while a low elastic recovery rate of the supporting posts is required during a low air pressure test. Consequently, the supporting posts are difficult to test, thereby reducing a yield rate of the LCD panels.

As a result, there is a technical problem of a low yield rate of LCD panels due to poor performance of supporting posts in conventional LCD panels.

SUMMARY OF THE INVENTION

An embodiment of the present disclosure provides an LCD device and a manufacturing method thereof to solve a problem of a low yield rate of LCD panels due to poor performance of supporting posts in conventional LCD panels.

To solve the above problem, technical solutions provided by the present disclosure are described as follows.

An embodiment of the present disclosure provides an LCD device, including:

an LCD panel, wherein the LCD panel includes a first substrate, a second substrate, and a liquid crystal layer disposed between the first substrate and the second substrate, and the first substrate includes a plurality of supporting posts; and a temperature sensing driver chip, wherein the temperature sensing driver chip is configured to sense changes in temperature, and outputs a voltage signal according to the changes in temperature.

A side of at least one of the supporting posts is provided with a control electrode, the control electrode is connected to the temperature sensing driver chip and is configured to control heights of the supporting posts, and a plurality of organic material spheres are disposed in at least one of the supporting posts.

In some embodiments, the LCD display device further includes a driver chip, and the driver chip includes the temperature sensing driver chip and a circuit driver chip.

In some embodiments, the temperature sensing driver chip is disposed on a bottom side of the LCD panel and is connected to the control electrode by a connecting line.

In some embodiments, the temperature sensing driver chip includes a temperature sensing unit and a driver unit connected to each other, and the driver unit is connected to the control electrode.

In some embodiments, the supporting posts include a plurality of main supporting posts and a plurality of secondary supporting posts, a side of the main supporting posts is provided with the control electrode, and a side of the secondary posts is not provided with the control electrode.

In some embodiments, the supporting posts include a plurality of main supporting posts and a plurality of secondary supporting posts, a side of the secondary supporting posts is provided with the control electrode, and a side of the main posts is not provided with the control electrode.

In some embodiments, the supporting posts include a plurality of main supporting posts and a plurality of secondary supporting posts, a side of the main supporting posts is provided with the control electrode, and a side of the secondary posts is provided with the control electrode.

In some embodiments, the organic material spheres include a plurality of hollow organic material spheres and a plurality of solid organic material spheres.

In some embodiments, the first substrate includes an array substrate including a color resist layer.

In some embodiments, the first substrate includes a pixel electrode layer, and the control electrode is formed from the pixel electrode layer by etching.

In some embodiments, a material of the control electrode includes indium tin oxide.

In some embodiments, a width of the control electrode ranges from 50 nm to 300 nm.

In some embodiments, the width of the control electrode is greater than diameters of the supporting posts.

In some embodiments, the first substrate includes a pixel electrode layer and a control electrode layer disposed on the pixel electrode layer, and the control electrode is formed from the control electrode layer by etching.

In some embodiments, the heights of the supporting posts range from 1 µm to 10 µm.

In some embodiments, diameters of the supporting posts range from 5 µm to 100 µm.

In some embodiments, the first substrate includes an array substrate, and the second substrate includes a color filter substrate including a color resist layer.

In some embodiments, the first substrate includes a color filter substrate including a color resist layer.

Furthermore, an embodiment of the present disclosure provides a method of manufacturing the LCD device, including:

providing a first base plate;

forming a driver circuit layer on the first base plate;

forming a pixel electrode layer on the driver circuit layer;

etching the pixel electrode layer to form a plurality of control electrodes;

forming a plurality of supporting posts on the control electrodes to form a first substrate, wherein a plurality of organic material spheres are disposed in the supporting posts;

aligning the first substrate with a second substrate to form a cell, and injecting a plurality of liquid crystals into the cell to form an LCD panel; and providing a temperature sensing driver chip, and connecting the control electrodes to the temperature sensing driver chip to form the LCD device.

In some embodiments: the temperature sensing driver chip outputs a voltage signal to the control electrodes when sensing changes in temperature, and the control electrodes control heights of the supporting posts when receiving the voltage signal.

Regarding the beneficial effects: embodiments of the present disclosure provide an LCD device and a manufacturing method thereof. The LCD device includes a temperature sensing driver chip and an LCD panel. The LCD panel includes a first substrate, a second substrate, and a liquid crystal layer disposed therebetween. The first substrate includes a plurality of supporting posts, and the temperature sensing driver chip is configured to sense changes in temperature and outputs a voltage signal according to the changes in temperature. A side of at least one of the supporting posts is provided with a control electrode, and the control electrode is connected to the temperature sensing driver chip and is configured to control heights of the supporting posts. A plurality of organic material spheres are disposed in at least one of the supporting posts. In the present disclosure, the temperature sensing driver chip senses changes in temperature and outputs a voltage signal according to the changes in temperature, thereby forming an electric field between the control electrode and a common electrode. The heights of the supporting posts are changed by the electric field so that stretching and shrinking of the supporting posts can be controlled by the control electrode. Therefore, changes in heights of the supporting posts follow the changes in temperature during a temperature test, thereby enhancing performance of supporting posts. Moreover, the organic material spheres may improve stress tolerance of the supporting posts, thereby improving performance of the supporting posts when stresses are applied thereto. As a result, a technical problem of a low yield rate of LCD panels due to poor performance of the supporting posts in conventional LCD panels is solved.

DESCRIPTION OF SPECIFIC EMBODIMENTS OF THE INVENTION

An LCD device and a manufacturing method thereof of the present disclosure are described below in detail with reference to accompanying drawings to make objectives, technical solutions, and effectiveness of the present disclosure clearer and easier to be understood. It should be noted that described embodiments are merely used to construct the present disclosure and are not intended to limit the present disclosure.

An embodiment of the present disclosure can solve a technical problem of a low yield rate of LCD panels due to poor performance of supporting posts in conventional LCD panels.

Figure 1:
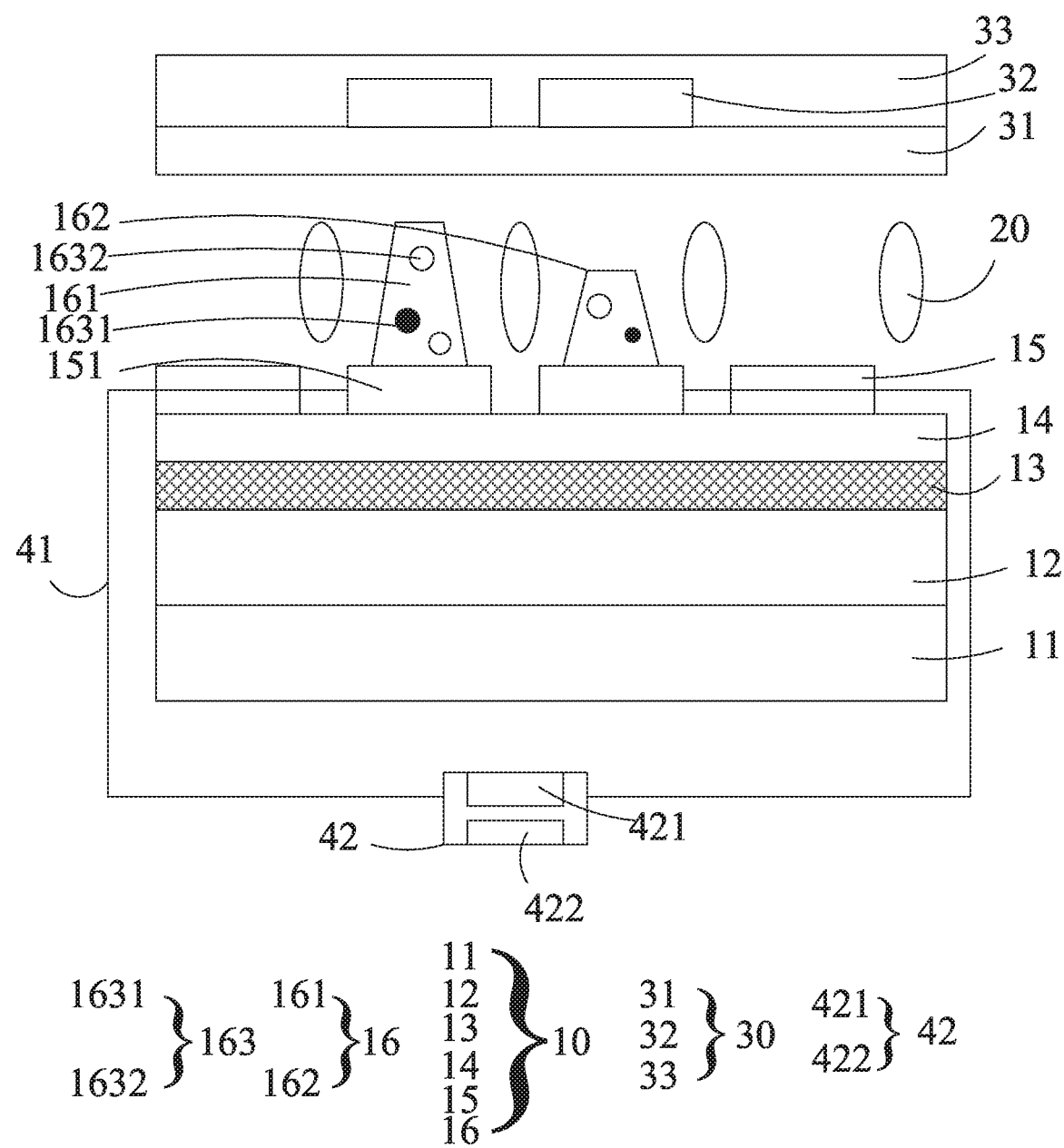
FIG. 1 is a first schematic view showing an LCD device provided by an embodiment of the present disclosure.

As shown in FIG. 1, an embodiment of the present disclosure provides an LCD device, including:

an LCD panel, wherein the LCD panel includes a first substrate 10, a second substrate 30, and a liquid crystal layer 20 disposed therebetween, and the first substrate 10 includes a plurality of supporting posts 16; and a temperature sensing driver chip 42, wherein the temperature sensing driver chip 42 is configured to sense changes in temperature, and outputs a voltage signal according to the changes in temperature.

A side of at least one of the supporting posts 16 is provided with a control electrode 151, the control electrode 151 is connected to the temperature sensing driver chip 42 and is configured to control stretching and shrinking of the supporting posts 16, and a plurality of organic material spheres 163 are disposed in at least one of the supporting posts 16.

The present embodiment provides an LCD device including a temperature sensing driver chip and an LCD panel. The LCD panel includes a first substrate, a second substrate, and a liquid crystal layer disposed therebetween. The first substrate includes a plurality of supporting posts, and the temperature sensing driver chip is configured to sense changes in temperature and output a voltage signal according to the changes in temperature. A side of at least one of the supporting posts is provided with a control electrode, and the control electrode is connected to the temperature sensing driver chip and is configured to control heights of the supporting posts. A plurality of organic material spheres are disposed in at least one of the supporting posts. In the present disclosure, the temperature sensing driver chip senses changes in temperature and outputs a voltage signal according to the changes in temperature, thereby forming an electric field between the control electrode and a common electrode. The heights of the supporting posts are changed by the electric field so that stretching and shrinking of the supporting posts can be controlled by the control electrode. Therefore, changes in the heights of the supporting posts follow the changes in temperature during a temperature test, thereby enhancing performance of the supporting posts. Moreover, the organic material spheres may improve stress tolerance of the supporting posts, thereby improving performance of the supporting posts when stresses are applied thereto. As a result, a technical problem of a low yield rate of LCD panels due to poor performance of the supporting posts in conventional LCD panels is solved.

In the present embodiment, it should be noted that the heights of the supporting posts may be changed according to changes in the electric field.

Figure 2:
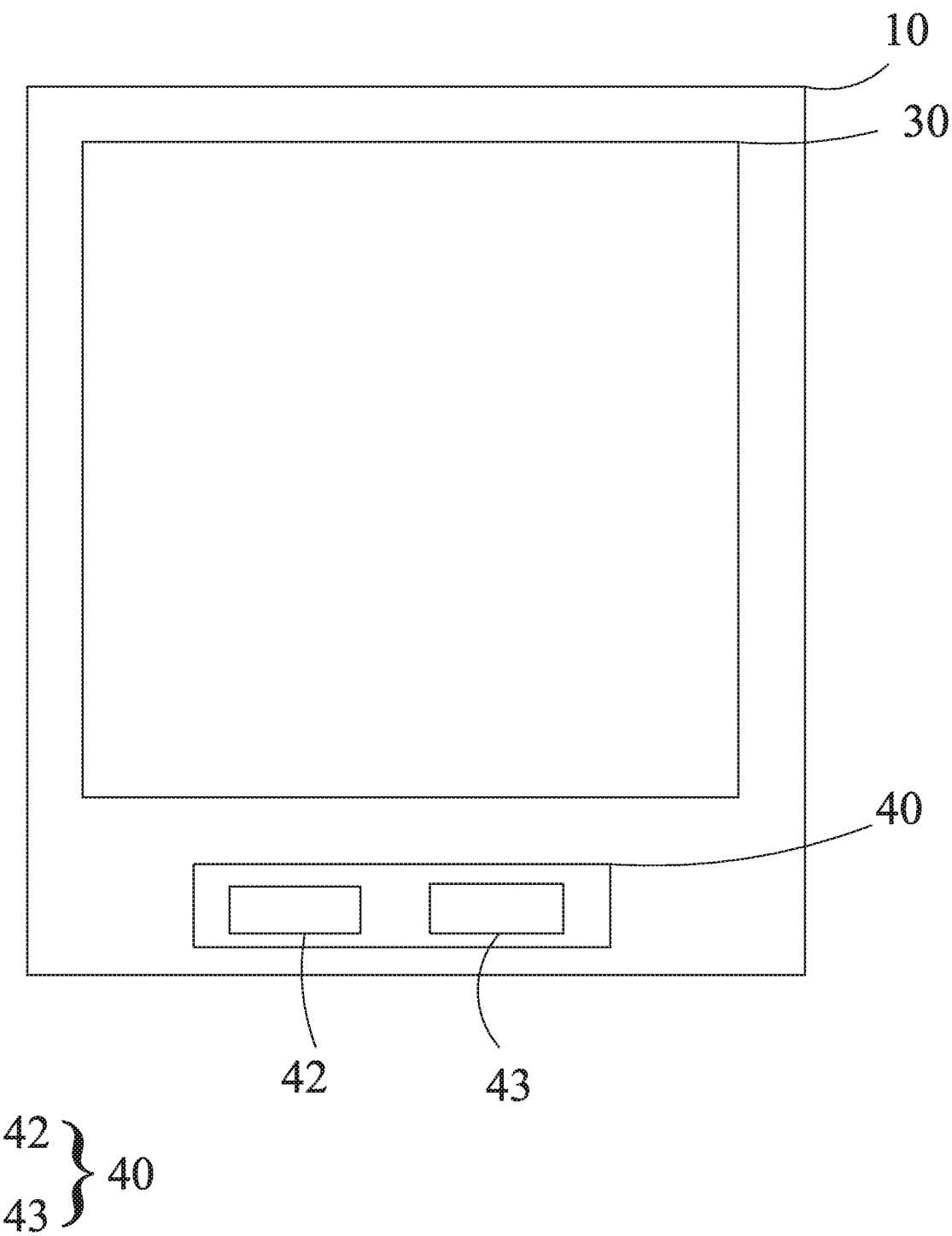
FIG. 2 is a second schematic view showing the LCD device provided by the embodiment of the present disclosure.

In one embodiment, as shown in FIG. 2, the LCD device further includes a driver chip 40 including the temperature sensing driver chip 42 and a circuit driver chip 43. The temperature sensing driver chip is disposed in the driver chip so that the circuit driver chip and circuits in the LCD device can work normally. Therefore, the LCD device can display normally. Furthermore, changes in heights of the supporting posts are driven by the temperature sensing driver chip. As a result, the supporting posts can better respond to a temperature test, and a yield rate of the LCD device can increase.

In one embodiment, the temperature sensing driver chip is connected to transistors of a driver circuit layer, and the transistors are connected to the control electrode. In a process of connecting the temperature sensing driver chip to the control electrode, the temperature sensing driver chip is connected to the transistors, and then the transistors are connected to the control electrode, which is similar to a connecting way of circuits (the circuit driver chip is connected to transistors, and then the transistors are connected to a pixel electrode). Therefore, the control electrode can be driven by the temperature sensing driver chip.

In one embodiment, as shown in FIG. 1, the temperature sensing driver chip 42 is disposed on a bottom side of an LCD panel and is connected to the control electrode 151 by a connecting line 41. By adding one temperature sensing driver chip to the LCD device, the temperature sensing driver chip can better sense changes in temperature and can output a voltage signal to the control electrode according to the changes in temperature. Therefore, an electric field applied to the supporting posts is changed, and heights of the supporting posts are changed according to changes in the electric field. As a result, during a temperature test, the heights of the supporting posts can be changed according to changes in the electric field. Consequently, problems of protruding supporting posts damaging layers or the supporting posts being unable to support a liquid crystal cell no longer exist.

In one embodiment, as shown in FIG. 1, the temperature sensing driver chip 42 includes a temperature unit 422 and a driver unit 421 connected to each other, and the driver unit 421 is connected to the control electrode 151. The temperature sensing unit is disposed in the temperature sensing driver chip. Particularly, the temperature sensing unit is disposed near an outside area, thereby precisely sensing changes in temperature. Furthermore, because the temperature sensing unit is connected to the driver unit, the temperature sensing unit can transmit signals to the driver unit after sensing the changes in temperature. Then, the driver unit outputs a voltage signal corresponding to the changes in temperature, thereby changing an electric field applied to the supporting posts. Changes in heights of the supporting posts follow the changes in temperature. Therefore, performance of the supporting posts is improved. During a temperature test of the LCD device, the supporting posts can work normally. As a result, a yield rate of the LCD device can increase.

In one embodiment, the supporting posts include a plurality of main supporting posts and a plurality of secondary supporting posts. A side of the main supporting posts is provided with the control electrode, while a side of the secondary supporting posts is not provided with the control electrode. During a process of disposing the supporting posts of the LCD device, the main supporting posts and the secondary supporting posts are provided. The main supporting posts play a main supporting role, and the secondary supporting posts play an auxiliary role. The main supporting posts have a better elastic recovery rate, which satisfy requirements of the LCD device during a high-temperature test. Therefore, a yield rate of the display device can increase.

In one embodiment, the supporting posts include the plurality of main supporting posts and the plurality of secondary supporting posts. A side of the main supporting posts is not provided with the control electrode, while a side of the secondary supporting posts is provided with the control electrode. As a result, an electric field between the control electrode and the common electrode can change heights of the secondary supporting posts. Therefore, the secondary supporting posts can be compressed during a low-temperature test of the secondary supporting posts, which satisfy requirements of the LCD device, and a yield rate of the LCD device can increase.

In one embodiment, as shown in FIG. 1, the supporting posts 16 include a plurality of main supporting posts 161 and a plurality of secondary supporting posts 162. A side of the main supporting posts 161 is provided with the control electrode 151, and a side of the secondary supporting posts 162 is also provided with the control electrode 151. That is, multiple control electrodes 151 are disposed on bottom sides of the main supporting posts and bottom sides of the secondary supporting posts; therefore, changes in heights of all of the supporting posts may follow changes in temperature. During such process, the control electrodes on the bottom side of the main supporting posts and the control electrodes on the bottom side of the secondary supporting posts can be controlled independently. Therefore, when the main supporting posts and the secondary supporting posts are tested, heights of them may be changed according to the changes in temperature, thereby ensuring that layers will not be damaged due to protruding supporting posts. Moreover, the supporting posts can support the liquid crystal cell, thereby protecting liquid crystals from compression, deformation, or even damage. As a result, the LCD device can display normally, and a yield rate of the display device can increase.

In some embodiments, the organic material spheres 163 include a plurality of hollow organic material spheres 1632 and a plurality of solid organic material spheres 1631. The organic material spheres are disposed in the supporting posts to improve performance of the supporting posts. Because of the organic material spheres, the supporting posts have a certain elastic recovery rate when enduring forces, and therefore can recover themselves into their original states during a pressure test. In a low-pressure environment, because the hollow organic material spheres and the solid organic material spheres are relatively stable, the supporting posts will not rebound between top and bottom, thereby preventing layers from being damaged by protruding supporting posts in a low-pressure state. As a result, a yield rate of the LCD device can increase.

In one embodiment, materials of the organic material spheres include at least one of acrylic resin, phenolic resin, polyester resin, or polyamide resin.

In one embodiment, as shown in FIG. 1, the first substrate 10 includes an array substrate, and the array substrate includes a first base plate 11, a driver circuit layer 12, a color resist layer 13, a protective layer 14, a pixel electrode layer 15, and a plurality of supporting posts 16. In color on array (COA) technology, the color resist layer is disposed on the array substrate, and the second substrate 30 includes a common electrode layer 31, a black matrix layer 32, and a second substrate 33. By disposing the plurality of control electrodes on a bottom side of the supporting posts, an electric field applied to the supporting posts can be controlled. Therefore, heights of the supporting posts are changed, and a yield rate of an LCD device having a COA substrate increases.

In one embodiment, the first substrate includes a pixel electrode layer that forms the control electrodes by being etched. When forming the pixel electrode layer, a plurality of pixel electrodes and the control electrodes may be formed simultaneously. As a result, not only can a thickness of the LCD panel be reduced, but one step can also be omitted. That is, the control electrodes can be obtained during a process of forming the pixel electrodes.

In one embodiment, materials of the control electrodes include indium tin oxide.

In one embodiment, thicknesses of the control electrodes range from 50 nm to 300 nm. When forming the pixel electrode layer, it is necessary to control the thicknesses of the control electrodes so that a thickness of the LCD panel will not be too thick due to overly thick control electrodes. As such, defects, such as breakage and perforation, will not happen on the control electrodes due to overly thin control electrodes. The thicknesses of the control electrodes range from 50 nm to 300 nm; therefore, the control electrodes having better performance can be achieved without increasing a thickness of the LCD panel. However, the thicknesses of the control electrodes are not limited to the present embodiment, and the thicknesses of the control electrodes can be correspondingly changed when performance of the control electrodes needs to be improved.

In one embodiment, widths of the control electrodes are greater than diameters of the supporting posts so that the control electrodes can support the supporting posts. Furthermore, all portions of the supporting posts are in an electric field; therefore, heights of the supporting posts can be correspondingly changed according to changes in the electric field, and performance of the supporting posts can be improved.

In one embodiment, the widths of the control electrodes range from 5 μm to 40 μm, the control electrodes are square, and cross-sections of the control electrodes are 5 μm*5 μm to 40 μm*40 μm squares. As a result, the supporting posts can be disposed on the control electrodes.

In one embodiment, the first substrate includes a pixel electrode layer and a control electrode layer disposed thereon. The control electrode layer forms the control electrodes by being etched. When forming the control electrodes, the control electrode layer, which is insulated from the pixel electrode layer, may be added to the first substrate. After the pixel electrode is formed by etching, the control electrode layer is formed on the pixel electrode layer. Then, the control electrodes corresponding to the supporting posts are formed by etching the control electrode layer. In the first substrate and on the first base plate, heights of the control electrodes may be equal to, greater than, or less than heights of the pixel electrodes according to practical requirements to control heights of the supporting posts as long as a thickness of a display panel does not increase.

In one embodiment, heights of the supporting posts range from 1 μm to 10 μm. In a case of the supporting posts including main supporting posts and secondary supporting posts, heights of the main supporting posts may be 8 μm, and heights of the secondary supporting posts may be 5 μm. Therefore, the main supporting posts can support a liquid crystal cell and the secondary supporting posts can assist the main supporting posts. The heights of the supporting posts may also be other values according to a thickness of the liquid crystal cell in a practical process.

In one embodiment, the diameters of the supporting posts range from 5 μm to 100 μm. As shown in FIG. 1, it should be noted that a shape of a longitudinal section of the supporting posts is trapezoidal, wherein the diameters of the supporting posts denote a width of a bottom of the trapezoid. The diameters of the supporting posts range from 5 μm to 100 μm so that the supporting posts will not take up too much space in a liquid crystal cell. Moreover, the supporting posts can support the liquid crystal cell.

In one embodiment, the first substrate includes an array substrate, and the second substrate includes a color filter substrate including a color resist layer. In an LCD panel having the array substrate and the color filter substrate, the supporting posts are disposed on the array substrate so that the control electrodes are disposed on the array substrate. Therefore, the heights of the supporting posts can be controlled by an electric field formed by the control electrodes, and a yield rate of the LCD device having the color filter substrate can be improved.

In one embodiment, the first substrate includes the color filter substrate, the second substrate includes the array substrate, and the color filter substrate includes the color resist layer. An electric field can be formed by disposing the supporting posts, which have electrodes on their top ends and bottom ends, on the color filter substrate. As a result, the heights of the supporting posts can be controlled by the electric field, thereby solving a problem of poor performance of supporting posts and improving a yield rate of the LCD device having the color filter substrate.

Figure 3:
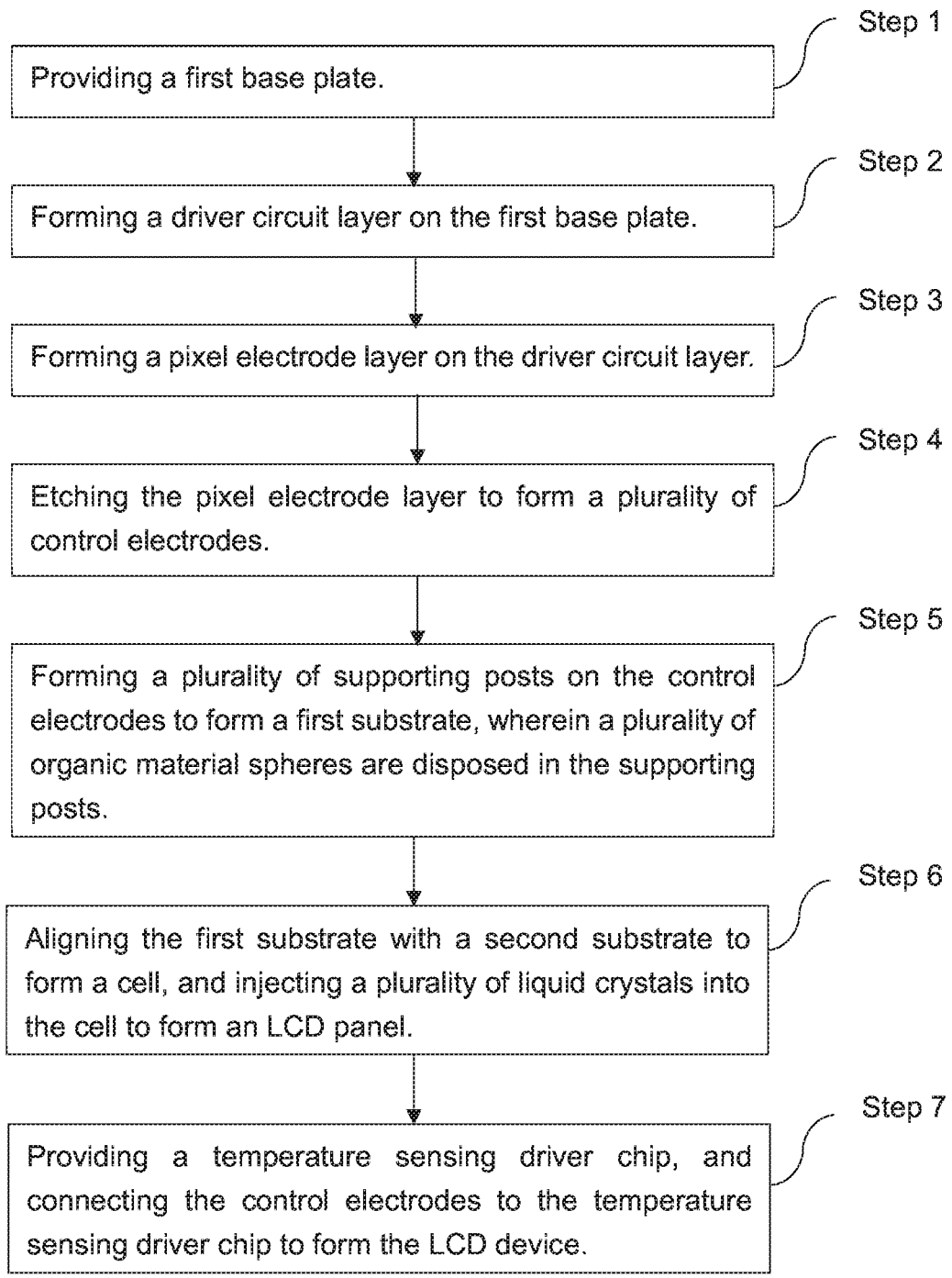
FIG. 3 is a flowchart showing a manufacturing method of an LCD device provided by an embodiment of the present disclosure.

As shown in FIG. 3, an embodiment of the present disclosure provides a method of manufacturing an LCD device, including following steps:

Step 1: providing a first base plate;

Step 2: forming a driver circuit layer on the first base plate;

Step 3: forming a pixel electrode layer on the driver circuit layer;

Step 4: etching the pixel electrode layer to form a plurality of control electrodes;

Step 5: forming a plurality of supporting posts on the control electrodes to form a first substrate, wherein a plurality of organic material spheres are disposed in the supporting posts;

Step 6: aligning the first substrate with a second substrate to form a cell, and injecting a plurality of liquid crystals into the cell to form an LCD panel; and Step 7: providing a temperature sensing driver chip, and connecting the control electrodes to the temperature sensing driver chip to form the LCD device.

An embodiment of the present disclosure provides a method of manufacturing an LCD device. The LCD device manufactured by the method includes a temperature sensing driver chip and an LCD panel. The LCD panel includes a first substrate, a second substrate, and a liquid crystal layer disposed therebetween. The first substrate includes a plurality of supporting posts, and the temperature sensing driver chip is configured to sense changes in temperature and output a voltage signal according to the changes in temperature. A side of at least one of the supporting posts is provided with a control electrode, and the control electrode is connected to the temperature sensing driver chip and is configured to control heights of the supporting posts. A plurality of organic material spheres are disposed in at least one of the supporting posts. In the present disclosure, the temperature sensing driver chip senses changes in temperature and outputs a voltage signal according to the changes in temperature, thereby forming an electric field between the control electrode and a common electrode. The heights of the supporting posts are changed by the electric field so that stretches and shrinks of the supporting posts can be controlled by the control electrode. Therefore, changes in the heights of the supporting posts follow the changes in temperature during a temperature test, thereby enhancing performance of supporting posts. Moreover, the organic material spheres may improve stress tolerance of the supporting posts, thereby improving performance of the supporting posts when stresses are applied thereto. As a result, a technical problem of a low yield rate of LCD panels due to poor performance of the supporting posts in conventional LCD panels is solved.

In one embodiment, the temperature sensing driver chip outputs a voltage signal to the control electrodes when sensing changes in temperature, and the control electrodes control heights of the supporting posts when receiving the voltage signal. After the LCD device is manufactured, the temperature sensing driver chip can transmit a voltage signal to the control electrodes after sensing (receiving) changes in temperature. Therefore, an electric field can be formed by the control electrodes to control the heights of the supporting posts. As a result, layers will not be damaged by protruding supporting posts, a liquid crystal cell can be supported by the supporting posts, and a yield rate of the LCD device can be improved.

According to the above embodiments, embodiments of the present disclosure provide an LCD device and a manufacturing method thereof. The LCD device includes a temperature sensing driver chip and an LCD panel. The LCD panel includes a first substrate, a second substrate, and a liquid crystal layer disposed therebetween. The first substrate includes a plurality of supporting posts, and the temperature sensing driver chip is configured to sense changes in temperature and output a voltage signal according to the changes in temperature. A side of at least one of the supporting posts is provided with a control electrode, and the control electrode is connected to the temperature sensing driver chip and is configured to control heights of the supporting posts. A plurality of organic material spheres are disposed in at least one of the supporting posts. In the present disclosure, the temperature sensing driver chip senses changes in temperature and outputs a voltage signal according to the changes in temperature, thereby forming an electric field between the control electrode and a common electrode. The heights of the supporting posts are changed by the electric field so that stretches and shrinks of the supporting posts can be controlled by the control electrode. Therefore, changes in the heights of the supporting posts follow the changes in temperature during a temperature test, thereby enhancing performance of supporting posts. Moreover, the organic material spheres may improve stress tolerance of the supporting posts, thereby improving performance of the supporting posts when stresses are applied thereto. As a result, a technical problem of a low yield rate of LCD panels due to poor performance of the supporting posts in conventional LCD panels is solved.

In summary, many changes and modifications to the described embodiment can be carried out by those skilled in the art, and all such changes and modifications are intended to be included within the scope of the appended claims.

What is claimed is:

1. A liquid crystal display (LCD) device, comprising:
    an LCD panel, wherein the LCD panel comprises a first substrate, a second substrate, and a liquid crystal layer disposed between the first substrate and the second substrate, and the first substrate comprises a plurality of supporting posts; and
    a temperature sensing driver chip, wherein the temperature sensing driver chip is configured to sense changes in temperature, and outputs a voltage signal according to the changes in temperature;
    wherein a side of at least one of the supporting posts is provided with a control electrode, the control electrode is connected to the temperature sensing driver chip and is configured to control heights of the supporting posts, and a plurality of organic material spheres are disposed in at least one of the supporting posts, the organic material spheres comprise a plurality of hollow organic material spheres and a plurality of solid organic material spheres.

2. The LCD device of claim 1, wherein the LCD display device further comprises a driver chip, and the driver chip comprises the temperature sensing driver chip and a circuit driver chip.

3. The LCD device of claim 1, wherein the temperature sensing driver chip is disposed on a bottom side of the LCD panel and is connected to the control electrode by a connecting line.

4. The LCD device of claim 3, wherein the temperature sensing driver chip comprises a temperature sensing unit and a driver unit connected to each other, and the driver unit is connected to the control electrode.

5. The LCD device of claim 1, wherein the supporting posts comprise a plurality of main supporting posts and a plurality of secondary supporting posts, a side of the main supporting posts is provided with the control electrode, and a side of the secondary supporting posts is not provided with the control electrode.

6. The LCD device of claim 1, wherein the supporting posts comprise a plurality of main supporting posts and a plurality of secondary supporting posts, a side of the secondary supporting posts is provided with the control electrode, and a side of the main supporting posts is not provided with the control electrode.

7. The LCD device of claim 1, wherein the supporting posts comprise a plurality of main supporting posts and a plurality of secondary supporting posts, a side of the main supporting posts is provided with the control electrode, and a side of the secondary supporting posts is provided with the control electrode.

8. The LCD device of claim 1, wherein the first substrate comprises an array substrate comprising a color resist layer.

9. The LCD device of claim 8, wherein the first substrate comprises a pixel electrode layer, and the control electrode is formed from the pixel electrode layer by etching.

10. The LCD device of claim 9, wherein a material of the control electrode comprises indium tin oxide.

11. The LCD device of claim 10, wherein a width of the control electrode ranges from 50 nm to 300 nm.

12. The LCD device of claim 11, wherein the width of the control electrode is greater than diameters of the supporting posts.

13. The LCD device of claim 8, wherein the first substrate comprises a pixel electrode layer and a control electrode layer disposed on the pixel electrode layer, and the control electrode is formed from the control electrode layer by etching.

14. The LCD device of claim 1, wherein the heights of the supporting posts range from 1 μm to 10 μm.

15. The LCD device of claim 1, wherein diameters of the supporting posts range from 5 μm to 100 μm.

16. The LCD device of claim 1, wherein the first substrate comprises an array substrate, and the second substrate comprises a color filter substrate comprising a color resist layer.

17. The LCD device of claim 1, wherein the first substrate comprises a color filter substrate comprising a color resist layer.

18. A method of manufacturing a liquid crystal display (LCD) device, comprising:
    providing a first base plate;
    forming a driver circuit layer on the first base plate;
    forming a pixel electrode layer on the driver circuit layer;
    etching the pixel electrode layer to form a plurality of control electrodes;
    forming a plurality of supporting posts on the control electrodes to form a first substrate, wherein a plurality of organic material spheres are disposed in the supporting posts;
    aligning the first substrate with a second substrate to form a cell, and injecting a plurality of liquid crystals into the cell to form an LCD panel; and
    providing a temperature sensing driver chip, and connecting the control electrodes to the temperature sensing driver chip to form the LCD device; and wherein the temperature sensing driver chip outputs a voltage signal to the control electrodes when sensing changes in temperature, and the control electrodes control heights of the supporting posts when receiving the voltage signal.

* * * * *